No. 846,188. PATENTED MAR. 5, 1907.
S. K. DENNIS & F. W. RICE.
FERTILIZER DISTRIBUTER.
APPLICATION FILED FEB. 3, 1906.
3 SHEETS—SHEET 2.
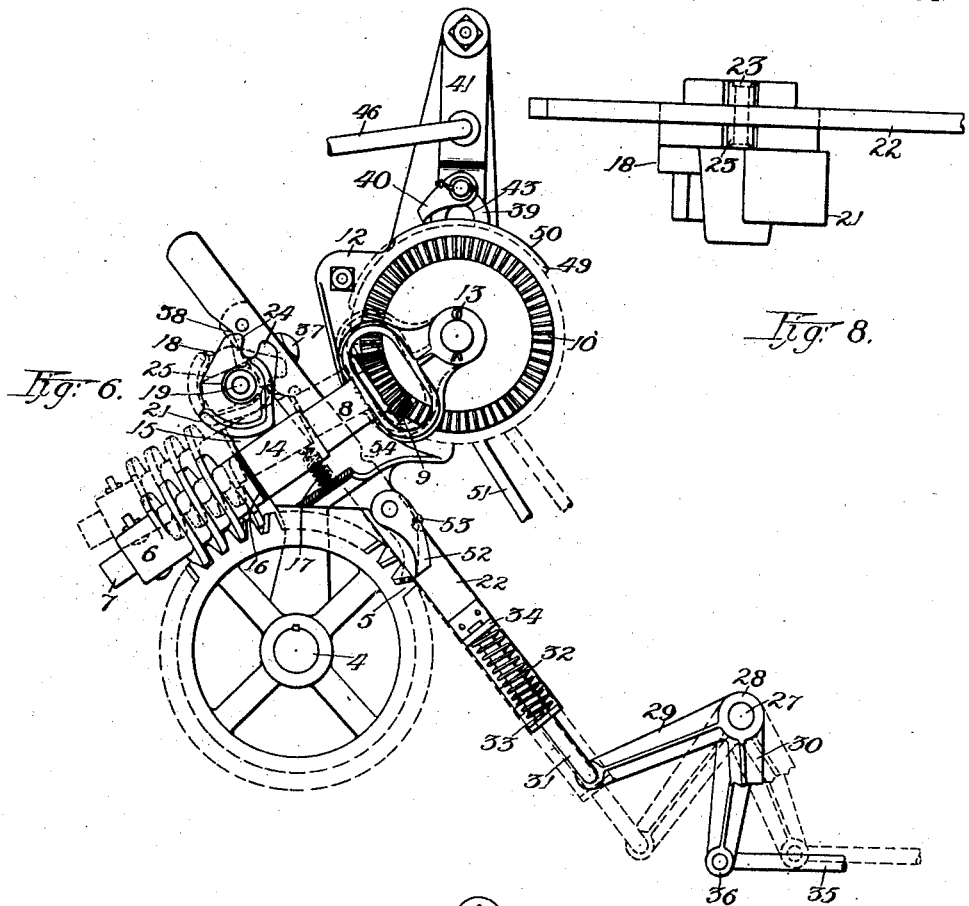
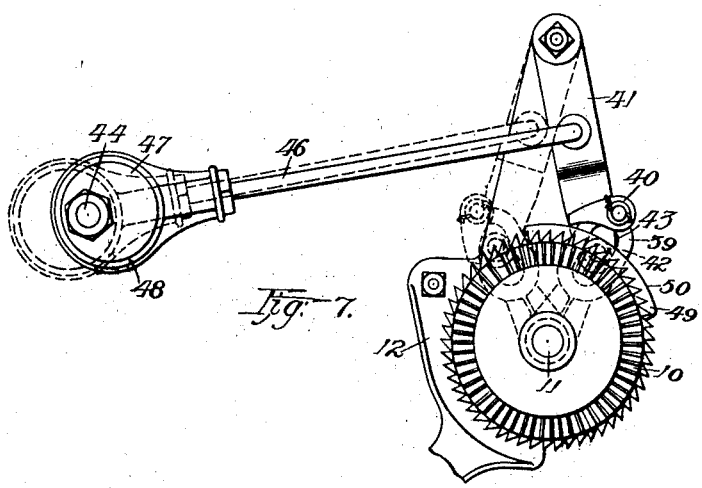
Witnesses:
J. N. Daggett
F. W. Hoffmeister
Inventors:
Samuel K. Dennis
AND
Frank W. Rice
By E. W. Burgess
Attorney

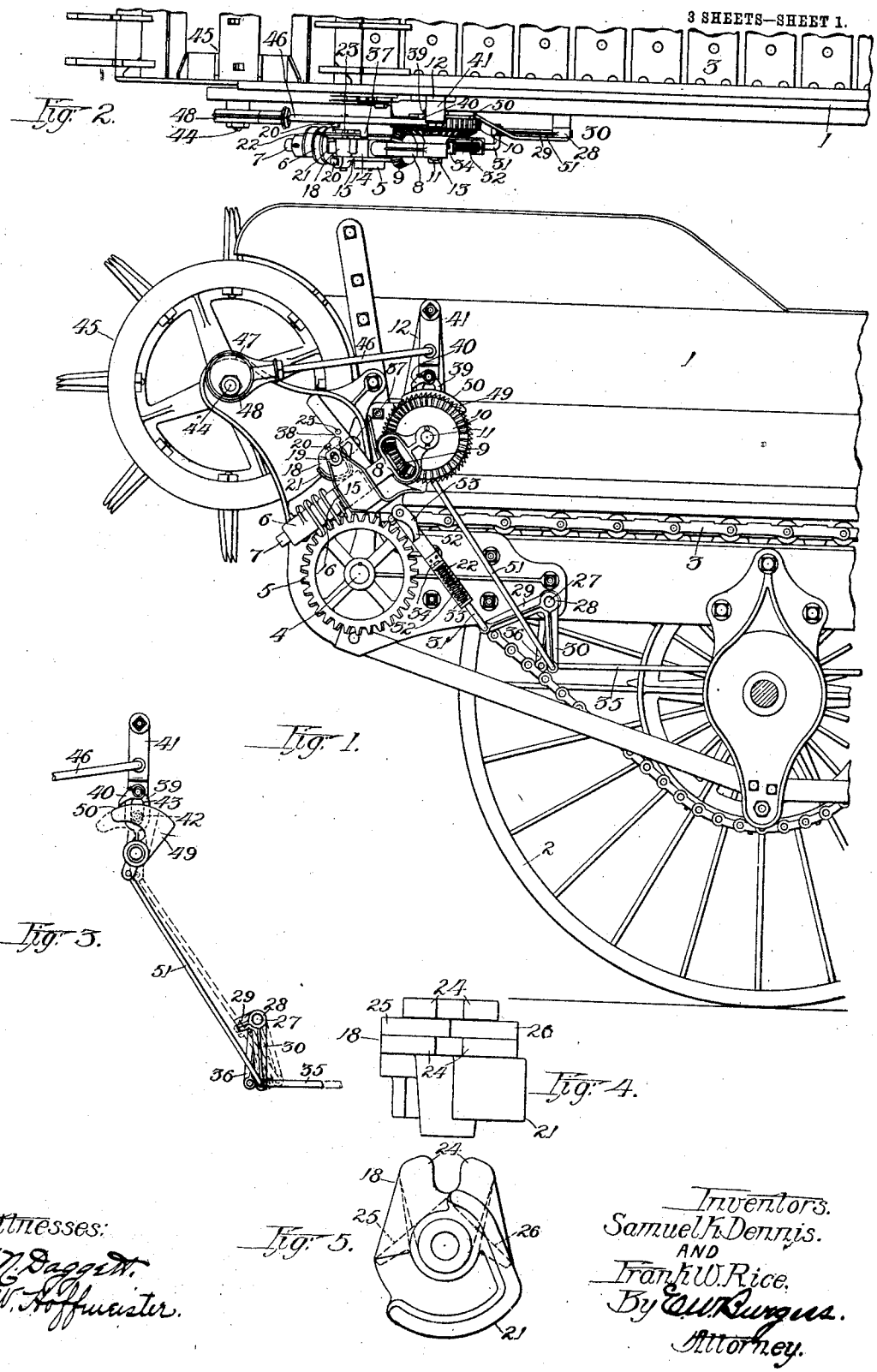

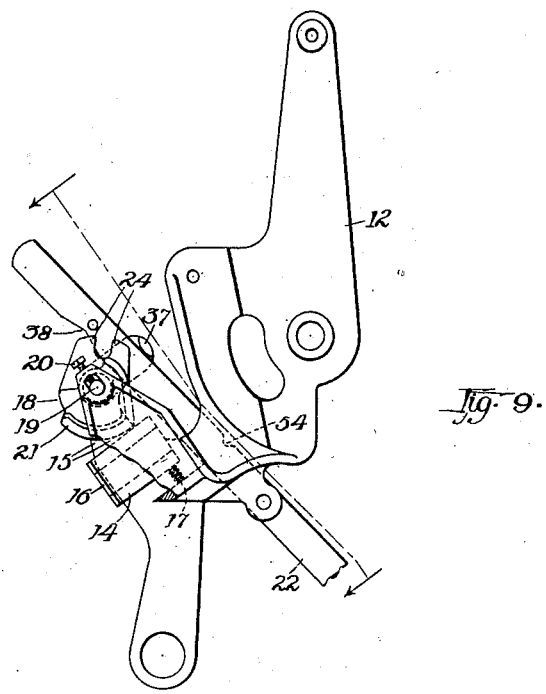
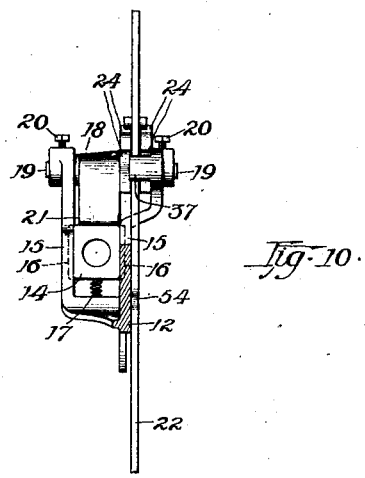

UNITED STATES PATENT OFFICE.

SAMUEL K. DENNIS AND FRANK W. RICE, OF CHICAGO, ILLINOIS, ASSIGNORS TO INTERNATIONAL HARVESTER COMPANY, A CORPORATION OF NEW JERSEY.

FERTILIZER-DISTRIBUTER.

No. 846,188.  Specification of Letters Patent.  Patented March 5, 1907.

Application filed February 3, 1906. Serial No. 299,253.

*To all whom it may concern:*

Be it known that we, SAMUEL K. DENNIS and FRANK W. RICE, citizens of the United States, residing at Chicago, in the county of Cook and State of Illinois, have invented certain new and useful Improvements in Fertilizer-Distributers, of which the following is a specification, reference being had to the accompanying drawing, forming a part thereof.

Our invention relates to fertilizer-distributers of that type having a movable flexible bottom for the receptacle adapted to convey the material toward a distributing-cylinder, rotatably mounted at the rear end thereof and deriving motion from the carrying-wheels in any approved way, and is designed to provide improved means for transmitting motion from the distributing-cylinder to the movable bottom.

The object of our invention is to provide a feed mechanism that will be positive in operation and one that may be regulated in a manner to permit a variable speed of the movable bottom from an extremely slow to a very high rate, as illustrated by the accompanying drawings, in which—

Figure 1 represents a side view of the rear end of a fertilizer-distributer embodying our invention. Fig. 2 is a sectional top plan view of parts shown on Fig. 1. Figs. 3, 4, and 5 represent details of construction. Figs. 6 and 7 represent enlarged side elevations of parts of Fig. 1, and Fig. 8 represents a detail of the gear-shipping mechanism. Figs. 9 and 10 represent detached views of details of the mechanism.

The same reference-numerals denote similar parts throughout the several views.

1 represents a portion of the receptacle suitably mounted upon combined carrying and traction wheels, (designated by 2.)

3 is a part of the movable bottom; 4, a driving-shaft having means engaging with the movable bottom in a manner to transmit motion thereto; 5, a gear-wheel secured to the shaft 4; 6, a worm-gear adapted to engage with the gear-wheel 5 and mounted upon one end of a shaft 7, that is journaled in a swinging bracket 8 and having a bevel-pinion 9, secured to its opposite end and meshing with a combined ratchet-wheel and bevel-gear 10, journaled upon a stud 11, secured to a supporting-plate 12. The swinging bracket 8 is mounted upon the outer end of the stud 11 and is held against lateral movement by means of the pin 13 and a journal-block 14, having parallel sides and adapted to slide in a yoke portion 15, integral with the plate 12, the journal-block having laterally-projecting lip portions 16, engaging with the side walls of the yoke in a manner to resist end thrust of the worm and shaft, said side walls designed to engage with the lip portions being formed concentric with the stud 11. The bracket 8 swings about the stud 11 as its axis and is caused to move in a direction to disengage the worm 6 from the gear-wheel 5 by means of a coiled spring 17, seated in the bottom of the yoke 15 and pressing upward against the journal-block 14. To swing the bracket in an opposite direction, we provide a cam-block 18, pivotally mounted upon a pin 19, passing laterally through openings in the upper ends of the side walls of the yoke, the openings being elongated in a manner to permit the pin to be adjusted toward or from the axis of the worm and shaft, and 20 designates adjusting-screws mounted at the ends of the side walls of the yoke and operative to adjust the pin in the manner described.

The block 18 is provided with a cam portion 21, adapted to engage with the journal-block 14, and it is rocked about its axis by means of a reciprocating bar 22, mounted to slide in bearings forming a part of the plate 12 and having a pin 23 projecting from opposite sides thereof and engaging with teeth 24, integral with the cam upon opposite sides of angularly-arranged stop-shoulders 25 and 26, with which the lower edge of the bar is adapted to contact in a manner to retain the cam in adjusted position.

A rock-shaft 27 is suitably mounted below the receptacle 1, and secured thereto is a bell-crank lever 28, having arms 29 and 30, and pivotally connected with arm 29 is one end of a link 31, having its opposite end slidably connected with the bar 22, and 32 is a coiled spring surrounding the link and operative between a pin 33 therethrough and a clip 34, secured to the bar in a manner to yieldingly hold the link in extended position, as shown in Fig. 6. Any convenient means may be provided for rocking the shaft 27 in its bearings, such as a rod 35, connected with a lever 36, secured to the shaft.

A lip 37, integral with the plate 12, overlaps the upper edge of the bar 22 in a manner to hold it in operative engagement with the cam-block 18, and a portion of the lower edge of the bar is cut away, as shown at 38, for the purpose of allowing the apex of the angle made by the angular stop-shoulders 25 and 26 to rotate without coming in contact therewith.

To impart motion to the operative parts, we provide a pawl-carrying arm 39, having its lower end pivotally mounted upon the stud 11, and a pawl 40 is pivotally mounted at the opposite end of the arm and adapted to engage with the ratchet portion of the wheel 10. A swinging lever 41, having its upper end pivotally connected with the plate 12 and its lower end provided with a roller 42, engaging with a longitudinal slot 43 in the pawl-arm 39, is connected with the extended end of the shaft 44, forming the axis of the distributing-cylinder 45, by means of the pitman 46, eccentric 47, secured to the shaft, and the bearing portion 48 of the pitman engaging therewith.

Pivotally mounted upon the stud 11, between the wheel 10 and the pawl-carrying arm 39, is a rocking-lever 49, having its upper end provided with a cam-surface 50, adapted to engage with the toe portion of the paw 40 in a manner to disengage it from the ratchet-teeth of the wheel 10 when said lever is moved in one direction, and a link 51 connects the lower end of the lever with the arm 30 of the bell-crank lever 28 in a manner to rock the lever 49 about its bearing when motion is imparted thereto, the position of the cam-surface 50 relative to the movement of the pawl-carrying arm regulating the amount of effective throw thereof.

Pivotally mounted upon the plate 12 is a pawl 52, adapted to engage with the teeth of the gear-wheel 5 in a manner to prevent its movement in one direction when engaged therewith, and a lip portion 53, integral with the pawl, overlaps the upper edge of the bar 22 in a manner to prevent the pawl from engaging with the teeth excepting when the bar is moved in a direction to release the worm 6 from engagement with the wheel 5, as shown by dotted lines in Fig. 6, when the lip 53 will fall into a depression 54, formed in the bar.

In operation motion is transmitted from the traction-wheels to the distributing-cylinder by any preferred means, and the cylinder imparts motion to the pawl-carrying arm and through it to the ratchet and bevel-wheel operatively connected with the shaft carrying the worm adapted to engage with the gear-wheel 5, secured to the feeder-shaft. The pawl-carrying arm is vibrated through an unvarying arc at all itmes, and the speed of the ratchet-wheel is governed by the effective operation of the pawl engaging therewith— that is, if the rock-arm 49 be moved in one direction the cam-surface 50, forming a part thereof, will be interposed between the toe of the pawl and the ratchet-wheel a greater or less part of the movement of the pawl-carrying arm proportionately with the degree of movement of the rocking-lever, which movement is controlled by the rock-shaft 27, that is actuated by means of the rod 35, the lever-arm and associated parts being so proportioned that the rock-arm 49 will be moved a sufficient distance in one direction to cause its cam-surface 50 to prevent any effective operation of the pawl mechanism relative to the wheel 10 before the bar 22 will operate to disengage the worm 6 from the gear-wheel 5, and if moved in an opposite direction the bar will cause the worm to engage before the cam allows the pawl mechanism to become effective as a power-transmitting medium. If the shipping mechanism be operated in a direction to cause the worm to engage with the gear-wheel 5 and it should come in contact with the points of the teeth thereof, the bar 22 will remain at rest and the link 31 slide against the force of the spring 32 in a manner to cause the bar to be moved by the reactionary force of the spring as soon as the worm is allowed to engage with the teeth of the wheel. When the bar 22 is moved in a direction to cause the worm to be disengaged, the pawl 52 will engage with the wheel 5 in a manner to prevent a rearward movement of the movable bottom.

What we claim as our invention, and desire to secure by Letters Patent, is—

1. A fertilizer-distributer comprising, in combination, a receptacle, a movable bottom forming part of said receptacle, a rotatable distributing-cylinder, means for moving said bottom toward said cylinder, said means comprising a shaft connected with said bottom, a gear-wheel secured to said shaft, a worm adapted to engage with said wheel, said worm having a gear connection with a ratchet-wheel rotatably mounted upon a fixed part of the machine, a pawl and a vibratile pawl-carrying arm, said pawl adapted to engage with said ratchet-wheel, and means connected with said cylinder and operative to vibrate said pawl-carrying arm.

2. A fertilizer-distributer comprising, in combination, a receptacle, a movable bottom forming part of said receptacle, a rotatable distributing-cylinder, means for moving said bottom toward said cylinder, said means comprising a shaft connected with said bottom, a gear-wheel secured to said shaft, a ratchet-wheel rotatably mounted on a fixed part of the machine, motion-transmitting means connecting said ratchet-wheel with said cylinder, a gear-bracket adapted to swing about the axis of said ratchet-wheel, a worm carried by said bracket and adapted to engage with said gear-wheel, a spring operative to disengage said worm from said wheel, a pivotally-mounted cam operative to swing said gear-bracket against the action of said spring, and means for operating said cam.

3. A fertilizer-distributer comprising, in combination, a receptacle, a movable bottom forming part of said receptacle, a rotatable distributing-cylinder, means for moving said bottom toward said cylinder, said means comprising a shaft connected with said bottom, a gear-wheel secured to said shaft, a ratchet-wheel rotatably mounted on a fixed part of the machine, motion-transmitting means connecting said ratchet-wheel with said cylinder, a gear-bracket adapted to swing about the axis of said ratchet-wheel, a worm carried by said bracket and deriving motion from said ratchet-wheel and adapted to engage with said gear-wheel, a spring operative to disengage said worm from said wheel, a pivotally-mounted cam, operative to swing said gear-bracket against the action of said spring, said cam having angularly-arranged stop-shoulders, a sliding bar adapted to rotate said cam and engaging with said angularly-arranged stop-shoulders in a manner to retain the cam in adjusted position, and means for operating said sliding bar.

4. A fertilizer-distributer comprising, in combination, a receptacle, a movable bottom forming part of said receptacle, a rotatable distributing-cylinder, means for moving said bottom toward said cylinder, said means comprising a shaft connected with said bottom, a gear-wheel secured to said shaft, a ratchet-wheel rotatably mounted on a fixed part of the machine, motion-transmitting means connecting said ratchet-wheel with said cylinder, a gear-bracket adapted to swing about the axis of said ratchet-wheel, a worm carried by said gear-bracket and deriving motion from said ratchet-wheel and adapted to engage with said gear-wheel, means for moving said bracket toward said gear-wheel, said means comprising a cam pivotally mounted upon a fixed part of the machine, said cam having angularly-arranged stop-shoulders and radially-projecting teeth upon opposite sides thereof, a sliding bar adapted to engage with said stop-shoulders and having oppositely-disposed projections adapted to engage with said teeth, and means for sliding said bar.

5. A fertilizer-distributer comprising, in combination, a receptacle, a movable bottom forming part of said receptacle, a rotatable distributing-cylinder, means for moving said bottom toward said cylinder, said means comprising a shaft connected with said bottom, a gear-wheel secured to said shaft, a ratchet-wheel journaled upon a fixed part of the machine, motion-transmitting means connecting said ratchet-wheel with said cylinder, a gear-bracket adapted to swing about the axis of said ratchet-wheel, a worm carried by said bracket and deriving motion from said ratchet-wheel and adapted to engage with said gear-wheel, means for moving said bracket toward said gear-wheel, said means comprising a cam pivotally mounted upon a fixed part of the machine and engaging with said bracket, said cam having angularly-arranged stop-shoulders and radially-projecting teeth upon opposite sides thereof, a sliding bar adapted to engage with said stop-shoulders, said bar having oppositely-disposed projections adapted to engage with said teeth and a cut-away portion affording clearance for the angle of the stop-shoulders when the cam is rotated, and means for operating said bar.

6. A fertilizer-distributer comprising, in combination, a receptacle, a movable bottom forming part of said receptacle, a rotatable distributing-cylinder, means for moving said bottom toward said cylinder, said means comprising a shaft connected with said bottom, a gear-wheel secured to said shaft, a worm adapted to engage with said gear-wheel, motion-transmitting means connecting said worm with said cylinder, means for adjusting said worm toward or from said gear-wheel, said means comprising a rotatable cam, a sliding bar operatively connected with said cam, a pawl pivotally mounted upon a fixed part of the machine and adapted to lock said gear-wheel against movement in one direction, said pawl being controlled by said sliding bar, and means for operating said bar.

7. A fertilizer-distributer comprising, in combination, a receptacle, a movable bottom forming part of said receptacle, a rotatable distributing-cylinder, means for moving said bottom toward said cylinder, said means comprising a shaft connected with said bottom, a ratchet-wheel rotatably mounted upon a fixed part of the machine, motion-transmitting means connecting said ratchet-wheel and said shaft, motion-transmitting means connecting said distributing-cylinder and said ratchet-wheel, said second motion-transmitting means comprising a pawl-carrying arm pivotally mounted upon the axis of the ratchet-wheel, a pawl mounted upon said arm and adapted to engage with said ratchet-wheel, a pawl-controlling lever pivotally mounted upon the axis of the ratchet-wheel and having a cam-surface adapted to contact with the toe of said pawl in a manner to disengage it from the ratchet-wheel, and means for adjusting said pawl-controlling lever.

8. A fertilizer-distributer comprising, in combination, a receptacle, a movable bottom forming part of said receptacle, a rotatable distributing-cylinder, means for moving said bottom toward said cylinder, said means comprising a shaft connected with said bottom, a ratchet-wheel journaled upon a fixed part of the machine, motion-transmitting means connecting said shaft with said ratchet-wheel, motion-transmitting means connecting said distributing-cylinder and said ratchet-wheel, said second motion-transmitting means comprising a pawl-carrying arm pivotally mounted upon the axis of the ratchet-wheel, a pawl mounted upon said arm and adapted to engage with said ratchet-wheel, said pawl-arm having a longitudinally-arranged slot, a swinging lever having one end pivotally connected with a fixed part of the machine and provided with a roller at its opposite end adapted to engage with said slot, an eccentric forming part of said distributing-cylinder, and a pitman connection between said eccentric and said swinging lever.

9. A fertilizer-distributer comprising, in combination, a receptacle, a movable bottom forming part of said receptacle, a rotatable distributing-cylinder, means for moving said bottom toward said cylinder, said means comprising a shaft connected with said bottom, a gear-wheel secured to said shaft, a ratchet-wheel rotatably mounted upon a fixed part of the machine, motion-transmitting means connecting said ratchet-wheel with said cylinder, a gear-bracket adapted to swing about the axis of said ratchet-wheel, a worm carried by said gear-bracket and deriving motion from said ratchet-wheel and adapted to engage with said gear-wheel, means for moving said bracket toward said gear-wheel, said means comprising a cam pivotally mounted upon a fixed part of the machine, said cam having angularly-arranged stop-shoulders and radially-projecting teeth upon opposite sides thereof, a sliding bar adapted to engage with said stop-shoulders and having oppositely-disposed projections adapted to engage with said teeth, and means for positively sliding said bar in one direction and yieldingly in an opposite direction.

In witness whereof we hereto affix our signatures in presence of two witnesses.

SAMUEL K. DENNIS.
FRANK W. RICE.

Witnesses:
JAMES A. MOXEY,
CHARLIE H. MANGOLD.